United States Patent
Shih et al.

(10) Patent No.: US 12,165,350 B2
(45) Date of Patent: Dec. 10, 2024

(54) VERIFICATION METHOD OF DYNAMIC VIRTUAL IMAGE DISPLAY DISTANCE OF USER INTERFACE AND SYSTEM THEREOF

(71) Applicant: AUTOMOTIVE RESEARCH & TESTING CENTER, Changhua Hsien (TW)

(72) Inventors: Chun-Yao Shih, Changhua Hsien (TW); Hung-Pang Lin, Changhua Hsien (TW)

(73) Assignee: AUTOMOTIVE RESEARCH & TESTING CENTER, Changhua Hsien (TW)

( * ) Notice: Subject to any disclaimer, the term of this patent is extended or adjusted under 35 U.S.C. 154(b) by 581 days.

(21) Appl. No.: 17/526,907

(22) Filed: Nov. 15, 2021

(65) Prior Publication Data
US 2023/0154031 A1 May 18, 2023

(51) Int. Cl.
*G06T 7/70* (2017.01)

(52) U.S. Cl.
CPC ...... *G06T 7/70* (2017.01); *G06T 2207/30248* (2013.01)

(58) Field of Classification Search
CPC .... G06T 7/70; G06T 2207/30248; G06T 7/80
USPC ......................................................... 382/103
See application file for complete search history.

(56) References Cited

U.S. PATENT DOCUMENTS

| | | | |
|---|---|---|---|
| 9,600,078 B2* | 3/2017 | Rafii | G06T 15/20 |
| 10,132,633 B2* | 11/2018 | Liu | G06F 3/013 |
| 11,351,861 B2* | 6/2022 | Liao | B60K 28/066 |
| 2014/0125574 A1* | 5/2014 | Scavezze | G06F 21/34 |
| | | | 345/156 |
| 2021/0003847 A1* | 1/2021 | Tanaka | G02B 27/0172 |

* cited by examiner

*Primary Examiner* — Sheela C Chawan
(74) *Attorney, Agent, or Firm* — Birch, Stewart, Kolasch & Birch, LLP

(57) ABSTRACT

The invention provides a verification method of the dynamic virtual image display distance of a user interface, comprising the following steps: creating a tested image database; wherein the tested image database comprises a tested image displayed according to a standard virtual image display distance; displaying a first tested image; projecting a first image on a stacked image element; wherein the first image is displayed at a first virtual image display distance, which is the same with a first standard virtual image display distance of the first tested image; capturing the first tested image and the first image; performing a first reliability evaluation procedure for the first image and the first tested image; and calculating a first overlap ratio for the first image and the first tested image to verify accuracy of the user interface.

20 Claims, 6 Drawing Sheets

VERIFICATION METHOD OF DYNAMIC VIRTUAL IMAGE DISPLAY DISTANCE OF USER INTERFACE AND SYSTEM THEREOF

1. FIELD OF THE INVENTION

The disclosure relates to a verification method and a system thereof, and more particularly, a verification method of a dynamic virtual image display distance of a user interface and a system thereof.

2. Description of the Related Art

The head-up display (HUD) is widely used in a vehicle. Accuracy of the HUD will be determined by accuracy of a size of an image projected by the HUD. Common methods for measuring the distance displayed by the virtual image comprises a merging focus method, a reckoning method, and a triangular measurement method. All of the methods cannot achieve the demands for a wide measurement range of lenses, a high measurement speed, and a low equipment requirement.

The merging focus method captures a clarity image for testing a virtual image display distance. However, the merging focus method needs to use an equipment with a short focal range to measure the virtual image display distance. Therefore, the merging focus method has a narrow measurement range. Moreover, since lens of the equipment used by the merging focus method needs to adjust focus for merging focus, a speed for measuring the virtual image distance by the merging focus method is slow. In addition, since the merging focus method needs high resolution and multiple lenses, different virtual image display distances need to change lenses having different focuses. In this way, the merging focus method cannot achieve to dynamically and continuously measure different virtual image display distances. In other words, the virtual image display distance of the merging focus method and lenses are one on one. Consequently, the merging focus method needs high requirement for the measurement equipment.

The reckoning method and the triangular measurement method utilize the equipment distance and the measured angle to calculate the relation of the images for testing the virtual image display distance. However, since the reckoning method and the triangular measurement method have high requirement for the resolution and the amount of the lenses, the equipment used by the reckoning method and the triangular measurement method for testing the virtual image display distance has high requirement. Furthermore, since the precision of the reckoning method is limited by the error of the image pixel, the precision of the reckoning method is low.

Accordingly, how to provide a verification method of the dynamic virtual image display distance of a user interface and a system thereof to solve the problems mentioned above is an urgent subject to tackle.

SUMMARY OF THE INVENTION

In view of this, the present invention provides a verification method of the dynamic virtual image display distance of a user interface, comprising the following steps: creating a tested image database; wherein the tested image database comprises at least one tested image displayed in at least one standard virtual image display distance; displaying a first tested image in the tested image database by a display element; projecting a first image on a stacked image element by a user interface; wherein the first image is displayed at a first virtual image display distance and the first virtual image display distance is the same with a first standard virtual image display distance of the first tested image; wherein the first image projected by the user interface module is used to be tested whether a first size of a first object of the first image correctly corresponds to the first virtual image display distance; capturing the first tested image and the first image by an image capturing module; performing a first reliability evaluation procedure for recognizing the first size of the first object of the first image and a second size of a tested object of the first tested image by an identifying module; and calculating a first overlap ratio for the first object of the first image and the first tested object of the first tested image by a processing module to verify accuracy of the first virtual image display distance of the user interface.

The present invention provides a verification system of the dynamic virtual image display distance for the user interface. The verification system of the dynamic virtual image display distance for the user interface comprises a tested image database, an image capturing module, an identifying module, and a processing module. The tested image database comprises at least one tested image. The first image is displayed in the first standard virtual image display distance. The tested image is the standard image for verifying a first image at a first virtual image display distance projected by a user interface. The image capturing module captures a first tested image of a plurality of tested images in the tested image database and captures the first image projected by the user interface. The first image corresponds to the first virtual image display distance and the first tested image corresponds to the first standard virtual image display distance. The first virtual image display distance is equal to the first standard virtual image display distance. The first image projected by the user interface module is used to be tested whether a first size of the first image correctly corresponds to the first virtual image display distance. The identifying module performs a reliability evaluation for recognizing the first size of a first object of the first image and a second size of a first tested object of the first tested image. The processing module calculates an overlap ratio for the first image and the first tested image to verify accuracy of the first image projected by the user interface according to the first virtual image display distance.

As mentioned above, the verification method of the dynamic virtual image display distance of a user interface and the system thereof of the present invention create the tested image database according to the predetermined virtual image display distance. In addition, the verification method and the system thereof can vary the information of the virtual image display distance according to the object on the road to correspond to the different object at the different distance. Moreover, the verification method and the system thereof perform the reliability evaluation and calculating the overlap ratio for the image which is used to be tested and the tested image, overlap different image information, directly display the images on the user interface, rapidly recognize the images, and promote the accuracy and the stability of the system which is under test. Besides, without extra hardware and without changing lenses, the verification method and the system thereof verify the virtual image display distance by contrasting the image which is under test with the tested image. Consequently, the verification method and the system thereof can reduce the test cost, dynamically and continuously measure the virtual image display distance, promote the verification effect and achieve the automatic verification effect.

DETAILED DESCRIPTION OF THE INVENTION

First of all, it should be interpreted that the verification method of the dynamic virtual image display distance of a user interface and the system thereof is utilized to verify the specifications of the user interface before shipping from the factory. Alternatively, the verification method and the system thereof are used to measure the specifications of the user interface after shipping from the factory, but it is not limited thereto in the present invention. Besides, the verification method of the dynamic virtual image display distance of a user interface of the present invention utilizes the user interface as the system which is under test to test and verify the accuracy of the dynamic virtual image display distance of the user interface. In an embodiment of the present invention, the user interface comprises a head-up display.

Figure 1A:
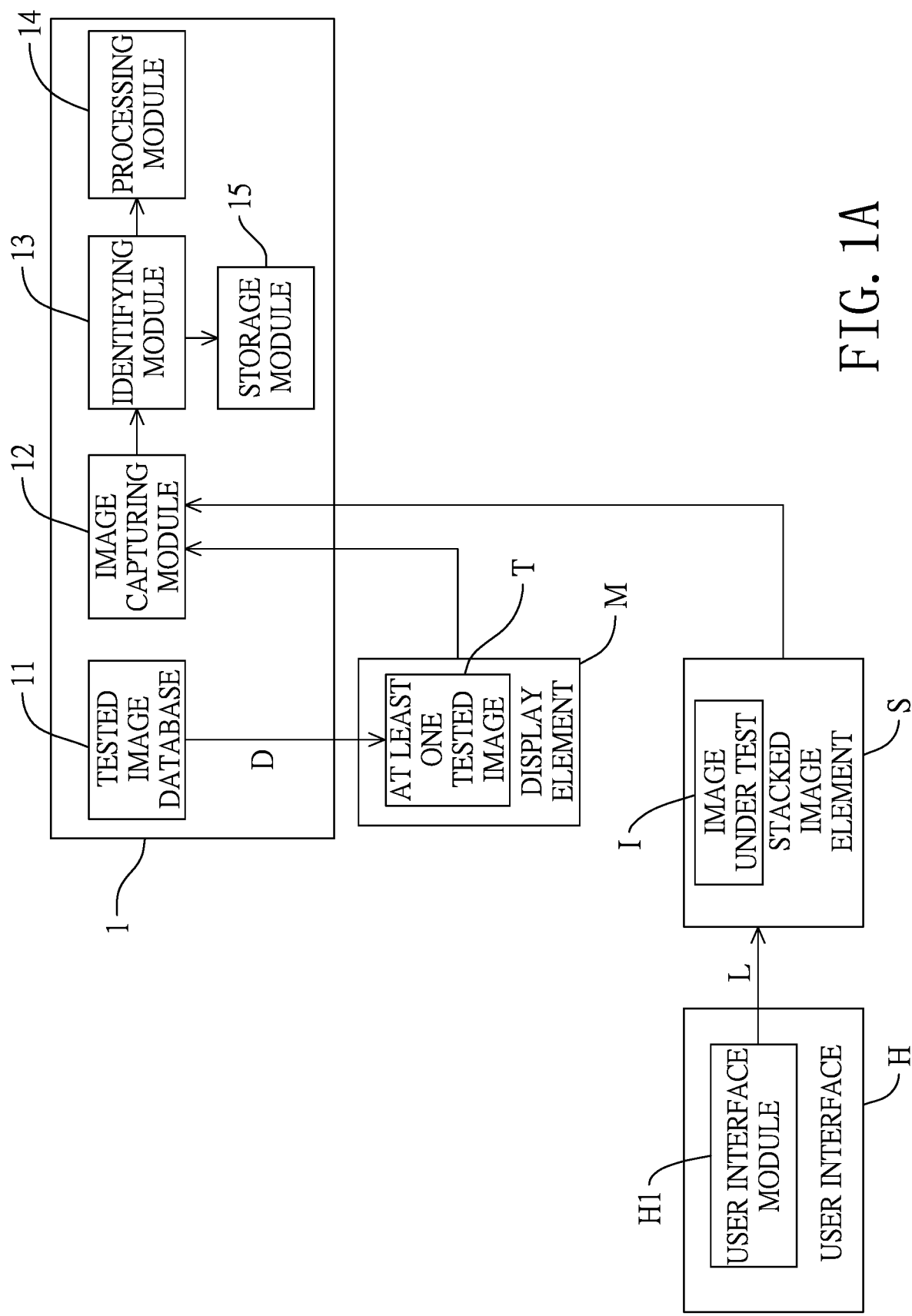
FIG. 1A is a block diagram of the verification system of the dynamic virtual image display distance for the user interface of the present invention.
Figure 1B:
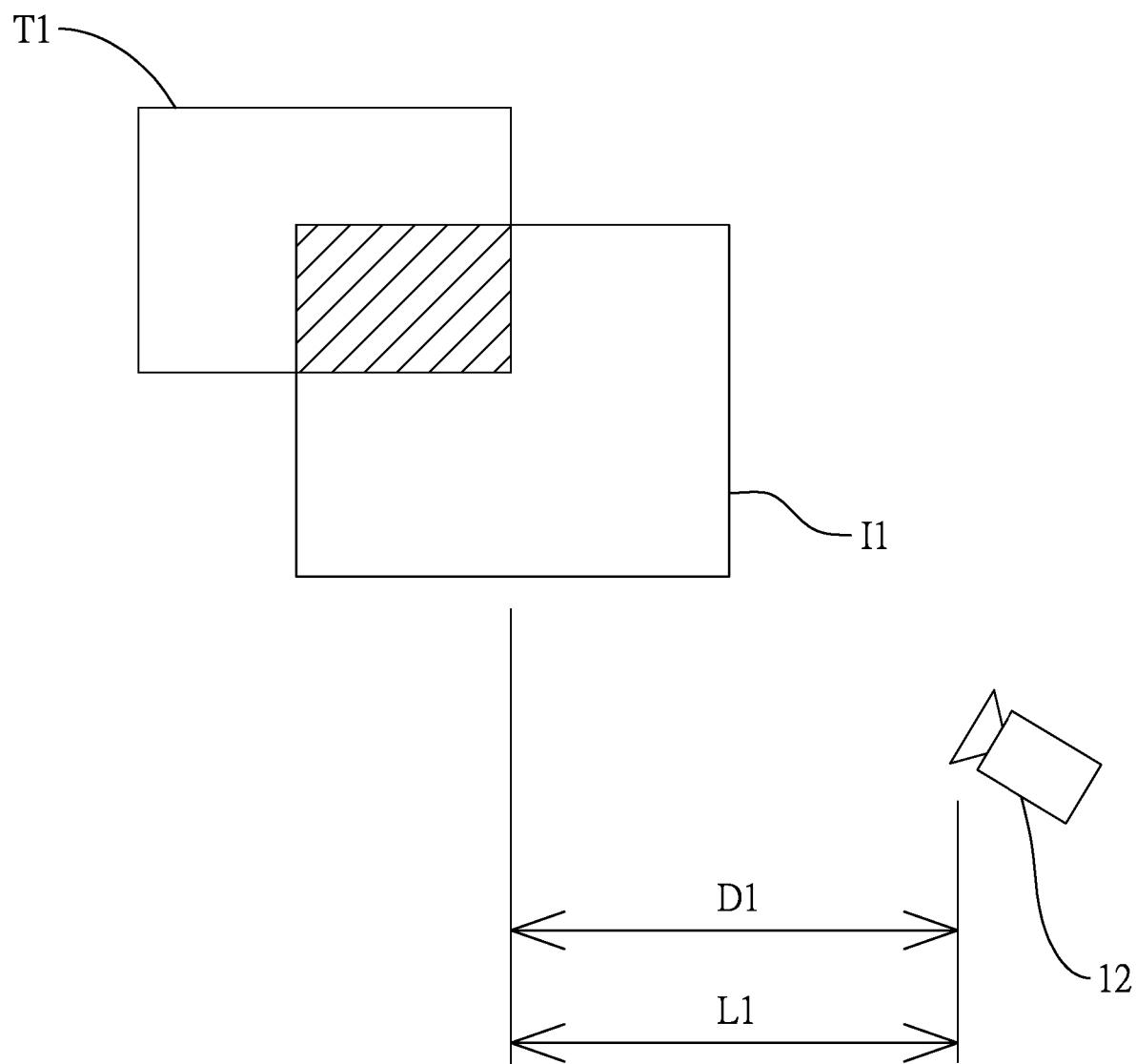
FIG. 1B is a schematic diagram of projecting the image which is under test and the tested image of the present invention.

Refer to FIG. 1A and FIG. 1B. FIG. 1A is the block diagram of the verification system of the dynamic virtual image display distance for the user interface of the present invention. FIG. 1B is the schematic diagram of projecting the first image according to the first virtual image display distance and projecting the first tested image according to the first standard virtual image display distance. The verification system of the dynamic virtual image display distance for the user interface 1 comprises a tested image database 11, an image capturing module 12, an identifying module 13, and a processing module 14. The tested image database 11 comprises at least one tested image T. The at least one tested image T is displayed according to at least one standard virtual image display distance D. The tested image T is the standard image for verifying an image I at a virtual image display distance L projected by a user interface module H1 of a user interface H. As shown in FIG. 1B, the image capturing module 12 captures a first tested image T1 of a plurality of tested images T in the tested image database 11 and captures a first image I1 projected by the user interface module H1, wherein the first tested image T1 is one of the at least one tested image T. The first image I1 corresponds to the first virtual image display distance L1 and the first tested image T1 corresponds to the first standard virtual image display distance D1. The first virtual image display distance L1 is equal to the first standard virtual image display distance D1. The identifying module 13 performs a reliability evaluation for recognizing a first size of a first object of the first image I1 and a second size of a first tested object of the first tested image T1. The processing module 14 calculates an overlap ratio for the first image I1 and the first tested image T1 to verify accuracy of the first image I1 projected by the user interface module H1 according to the first virtual image display distance L1.

Figure 1C:
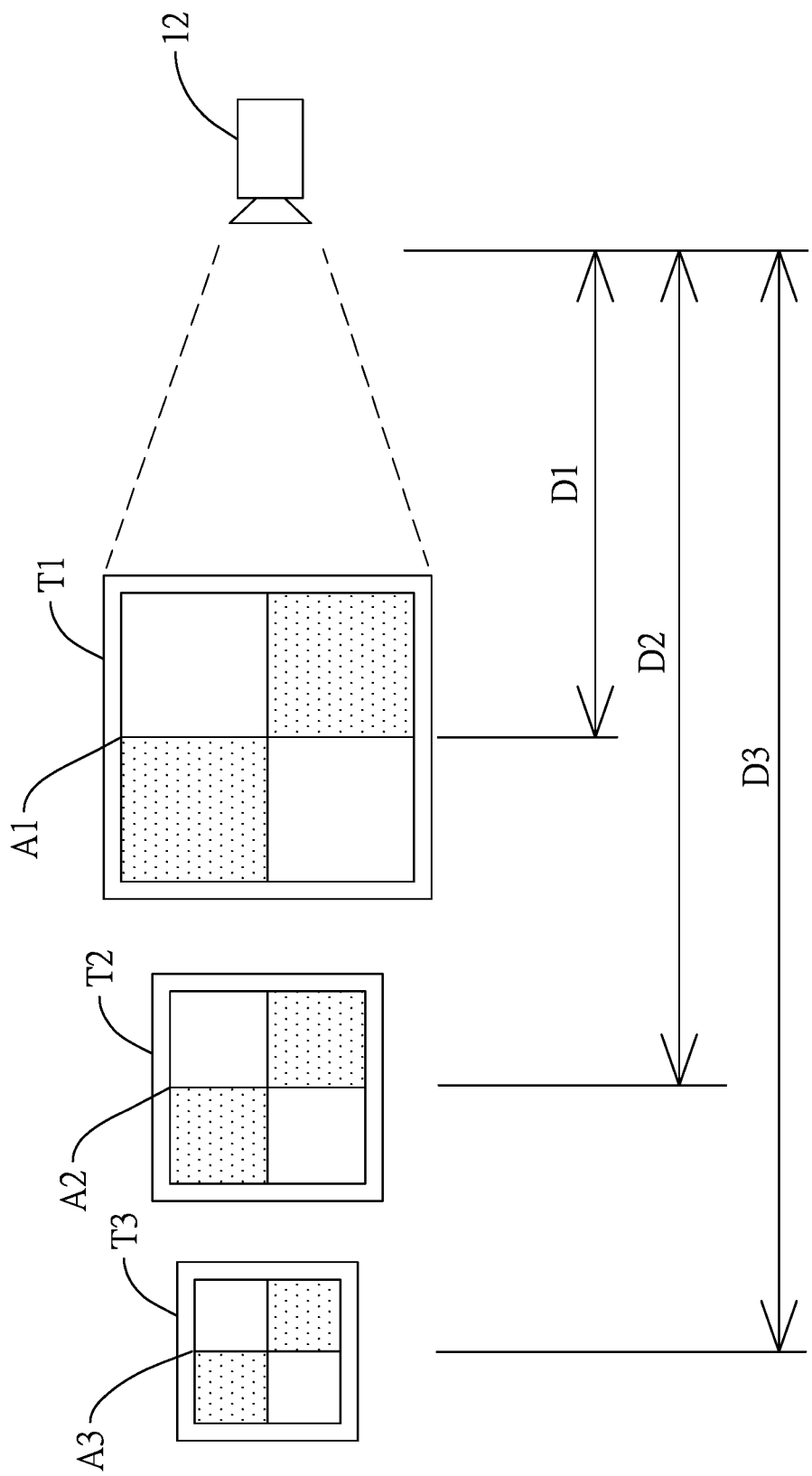
FIG. 1C is a schematic diagram of a plurality of tested objects captured by the image capturing module corresponding to a plurality of standard virtual image display distances of the present invention.

Refer to FIG. 1C. FIG. 1C is the schematic diagram of a plurality of tested objects respectively corresponding to a plurality of standard virtual image display distances measured by the image capturing module. The tested image database 11 is created according to a first tested object A1 of the first tested image T1 corresponding to the first standard virtual image display distance D1, a second tested object A2 of the second tested image T2 corresponding to the second standard virtual image display distance D2, and a third tested object A3 of the third tested image T3 corresponding to the third standard virtual image display distance D3 captured by the image capturing module 12. In other words, in the embodiment, the tested image database 11 is created by a real size of the tested object captured by the image capturing module 12.

Refer to FIG. 1A and FIG. 1C again. In a first embodiment of the present invention, the verification system of the dynamic virtual image display distance for the user interface 1 further comprises a storage module 15, storing a lookup table. The lookup table is created according to the first tested object A1, the second tested object A2, and the third tested object A3 captured by the image capturing module 12.

In a second embodiment, the image capturing module 12 captures a first tested object A1 of the first tested image T1 corresponding to the first standard virtual image display distance D1, a second tested object A2 of the second tested image T2 corresponding to the second standard virtual image display distance D2, and a third tested object A3 of the third tested image T3 corresponding to the third standard virtual image display distance D3. The processing module 14 generates a ratio relationship for a plurality of tested objects $An(n=1, 2, 3 \ldots)$ corresponding to a plurality of standard virtual image display distances D according to the size of the first tested object A1 corresponding to the first standard virtual image display distance D1, the size of the second tested object A2 corresponding to the second standard virtual image display distance D2, and the size of the third tested object A3 corresponding to the third standard virtual image display distance D3. The tested image database 11 is created according to the ratio relationship.

It should be noted that the amount captured by the image capturing module 12 is taken for an example but not to limit the scope of the present invention to either the first embodiment or the second embodiment. In fact, the amount captured by the image capturing module 12 is determined according to the standard of the accuracy to verify the virtual displaying distance.

As shown in FIG. 1A and FIG. 1B, the user interface module H1 is disposed in the user interface H. The user interface H comprises an optical axis (not shown in FIG. 1A and FIG. 1B). After calibrating the optical axis, the user interface H projects the image I on the stacked image element S according to the virtual image display distance L. In details, the image I is projected on the stacked image element S by the user interface module H1. Before that, the optical axis of the user interface H needs to be calibrated to ensure the image I can be accurately projected on the stacked image element S. In an embodiment, the stacked image element S comprises a windshield of a vehicle or a stacked image piece of the user interface H.

Figure 2A:
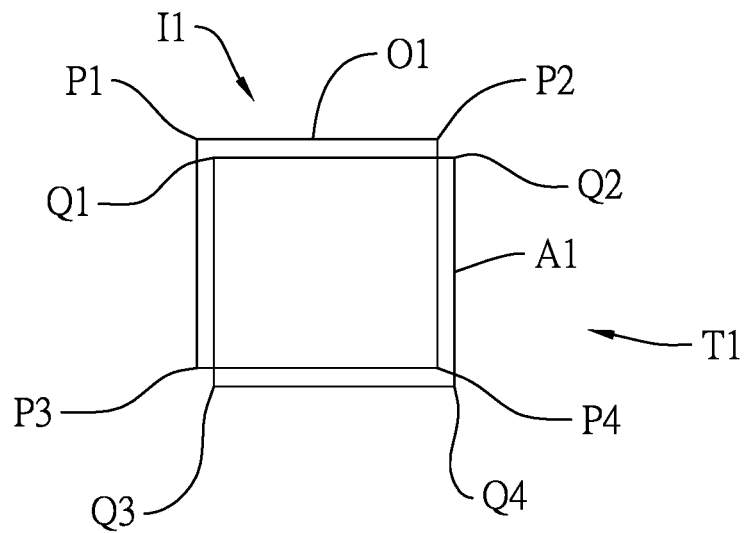
FIG. 2A is a schematic diagram of the first reliability evaluation procedure of the present invention.
Figure 2B:
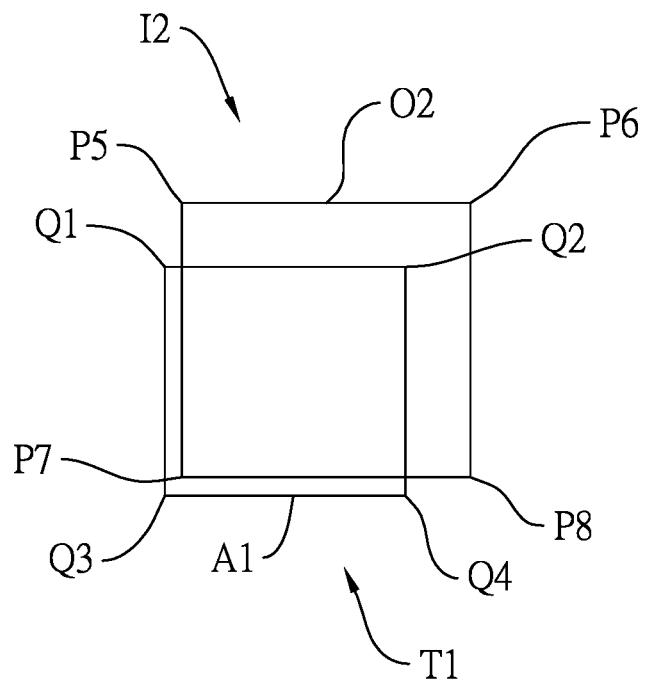
FIG. 2B is a schematic diagram of the second reliability evaluation procedure of the present invention.

Refer to FIG. 2A and FIG. 2B. FIG. 2A and FIG. 2B are the schematic diagram for the first reliability evaluation procedure and the second reliability evaluation procedure of the present invention. In FIG. 2A, the identifying module 13 recognizes a plurality of first distances between a plurality of feature vertexes P1, P2, P3, P4 of the first object O1 of the first image I1 and a plurality of vertex positions Q1, Q2, Q3, Q4 of the first tested object A1 of the first tested image T1. The processing module 14 determines the reliability of the first image I1 according to the plurality of first distances.

In FIG. 2B, when the first reliability of the first image I1 is unreliable in FIG. 2A, the user interface module H1 projects the second image O2 on the stacked image element S. The image capturing module 12 captures the second image I2 and the first tested image T1. The identifying module 13 recognizes a plurality of second distances between a plurality of feature vertexes P5, P6, P7, P8 of the second object O2 of the second image I2 and a plurality of vertex positions Q1, Q2, Q3, Q4 of the first tested object A1 of the first tested image T1. The processing module 14 determines the second reliability of the second image T2 according to the plurality of second distances. The second image T2 corresponds to the first virtual image display distance L1. In other words, at the same virtual image display distance, the image capturing module 12 captures a new image to calculate the reliability evaluation of the new image. The second image is displayed at a second virtual image display distance, and the second virtual image display distance is the same with a second standard virtual image display distance of a second tested image. The second image projected by the user interface module H1 is used to be tested whether a second size of the second image correctly corresponds to the second virtual image display distance.

As mentioned above, in addition to calculating the distance for determining the reliability, the step for calculating the first reliability evaluation procedure and the second reliability evaluation procedure in FIG. 2A and FIG. 2B further comprises the step for calculating the gradient between each adjacent feature vertexes of the object of the image by processing module 14 to determine the reliability. Moreover, in FIG. 2A, the distance of the plurality of feature vertexes P1, P2, P3, P4 of the first object O1 of the first image I1 close to the plurality of vertex positions Q1, Q2, Q3, Q4 of the first tested object A1 of the first tested image T1; however, the feature vertex P1, P2, P3, P4 may be disposed distortedly. Therefore, the processing module 14 determines the gradient between each two adjacent feature vertexes P1, P2, P3, P4 of the first object O1 to determine the shape of the first object O1; wherein the gradients comprise an X axial gradient and a Y axial gradient, such as the X axial gradient and the Y axial gradient between the feature vertex P1 and the feature vertex P2, the X axial gradient and the Y axial gradient between the feature vertex P1 and the feature vertex P3, the X axial gradient and the Y axial gradient between the feature vertex P2 and the feature vertex P4, and the X axial gradient and the Y axial gradient between the feature vertex P3 and the feature vertex P4. When the gradient is lower, the first object O1 is more approximate to a rectangle in shape. Hence, the processing module 14 determines that the first object O1 has a high reliability. When the gradient is higher, the first object O1 fails to be approximate to a rectangle in shape. Hence, the processing module 14 determines that the first object O1 has a low reliability. In another embodiment, as shown in FIG. 2B, the plurality of feature vertexes P5, P6, P7, P8 of the second object O2 are far away from the plurality of vertex positions Q1, Q2, Q3, Q4 of the first tested object A1 of the first tested image T1. However, after the processing module 14 calculates the gradient between each two adjacent feature vertexes P5, P6, P7, P8 and a plurality of second distances between each feature vertex P5, P6, P7, P8 and each vertex position Q1, Q2, Q3, Q4, the gradients between each two adjacent feature vertexes are equal to zero, that is, the shape of the second object O2 is approximate to the rectangle. As a result, the processing module 14 increases the weight of the gradient, decreases the weight of the plurality of second distances, and determines that the second object O2 has a high reliability according to the whole weight comprising the gradient and the plurality of second distances.

Figure 3C:
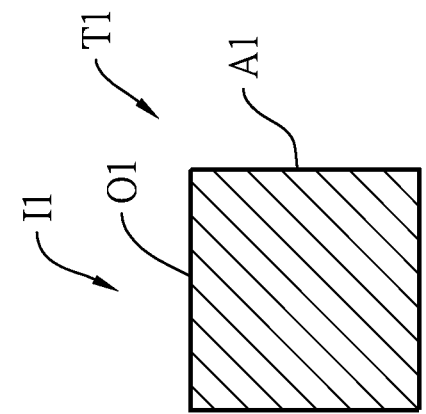
FIG. 3A to FIG. 3C are schematic diagrams of an overlap ratio.
Figure 3B:
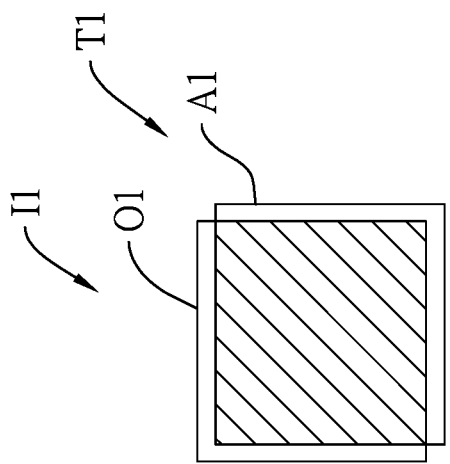
Figure 3A:
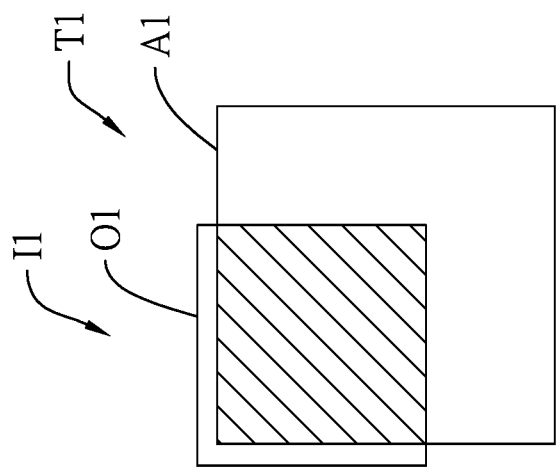

Refer to FIG. 3A to FIG. 3C. FIG. 3A to FIG. 3C are the schematic diagrams of the overlap ratio of the present invention. The processing module 14 calculates the overlap ratio for an area overlapping ratio between the first image I1 and the first tested image T1. The area overlapping ratio is generated by calculating the area overlapping ratio between the first object O1 of the first image I1 and the first tested object A1 of the first tested image T1 divided by the area of the first tested object A1 of the first tested image T1.

Figure 4:
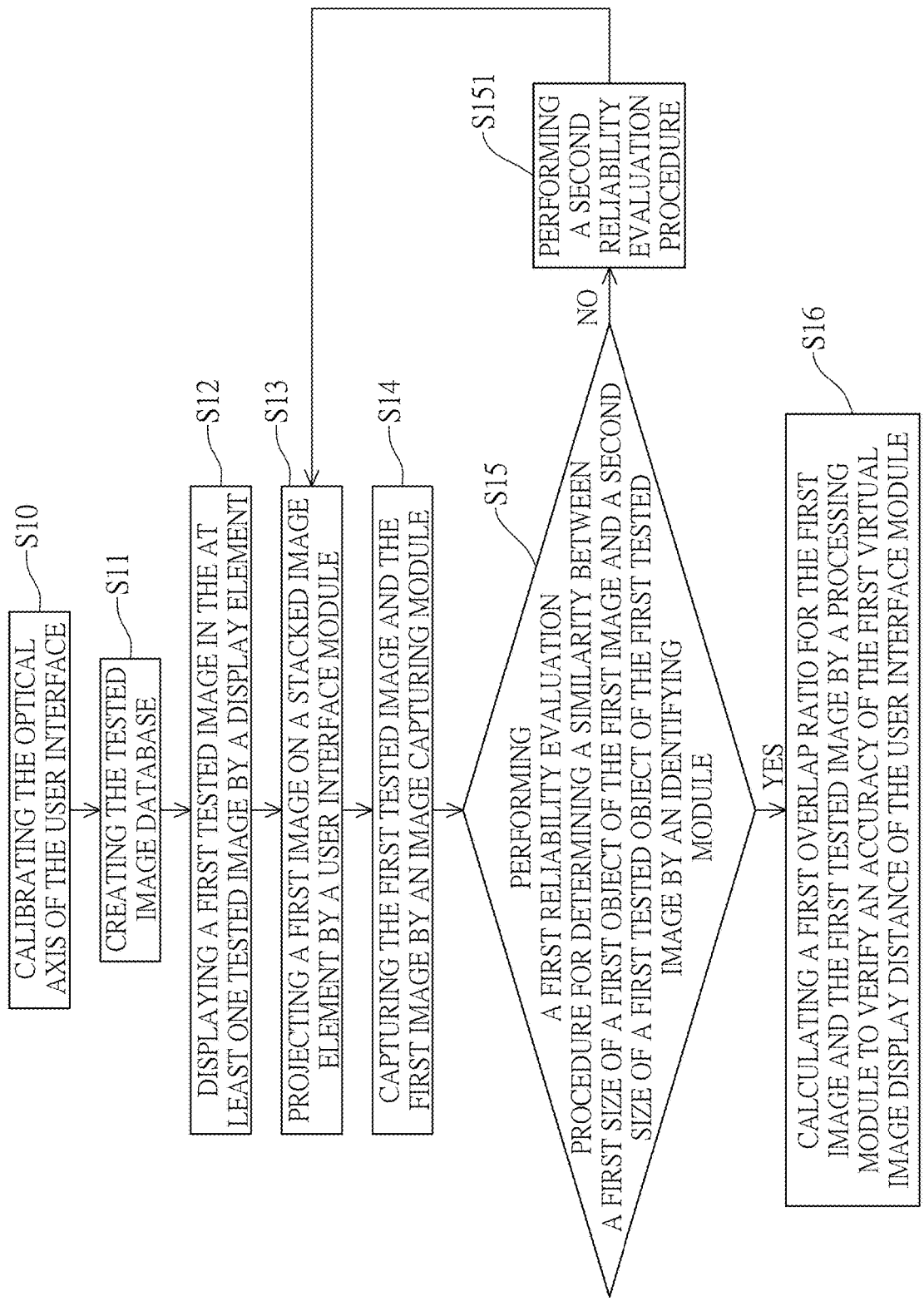
FIG. 4 is the flow diagram of the verification method of the dynamic virtual image display distance of a user interface.

Refer to FIG. 4. FIG. 4 is the flow diagram of the verification method of the dynamic virtual image display distance of a user interface. The verification method of the dynamic virtual image display distance of a user interface comprises the following steps: in step S11, creating a tested image database 11, wherein the tested image database 11 comprises at least one tested image T displayed according to at least one standard virtual image display distance D; in step S12, displaying a first tested image T1 in the at least one tested image T by a display element M; in step S13, projecting a first image I1 on a stacked image element S by a user interface module H1; wherein the first image I1 is displayed at a first virtual image display distance L1 and the first virtual image display distance L1 is the same with a first standard virtual image display distance D1 of the first tested image T1; in step S14, capturing the first tested image T1 and the first image I1 by an image capturing module 12; in step S15, performing a first reliability evaluation procedure for recognizing a first size of the first image I1 and a second size of the first tested image T1 by an identifying module 13; in step S16, calculating a first overlap ratio for the first image I1 and the first tested image T1 by a processing module 14 to verify accuracy of the first virtual image display distance L1 of the user interface module H1, wherein the identifying module 13 performs the reliability evaluation for the first object O1 of the first image I1 and the first tested object A1 of the first tested image T1. The reliability evaluation relates to whether the shape of the first object O1 is approximate to a rectangle. It should be noted that the term "first" is used to illustrate the number for verifying the dynamic virtual image display distance of the user interface H, but not limited thereto. The number is determined by the actual demand for the accuracy of the user interface H. In other words, if the tested image database 11 comprises such as the first tested image T1, the second tested image T2, and the third tested image T3, the method can perform three times of verifying the virtual image display distance L according to the three tested images with the three images which are used to be tested to promote the accuracy of the user interface H.

Refer to FIG. 4 again: the verification method of the dynamic virtual image display distance of a user interface further comprises the step S10 for calibrating the optical axis of the user interface H. After that, the user interface module H1 projects the image to the stacked image element S according to the virtual image display distance. In details, in step S13, the user interface module H1 projects the first image I1 to the stacked image element S. Before that, the optical axis of the user interface H needs to be calibrated to ensure the first image I1 can be accurately projected on the stacked image element S. In an embodiment, the stacked image element S comprises a windshield of a vehicle or a stacked image piece of the user interface H.

Refer to FIG. 1C again. In step S11 for creating the tested image database 11, the step S11 comprises records and captures the plurality of tested objects A1, A2, A3 respectively corresponding to the plurality of standard virtual image display distances D1, D2, D3 by the image capturing module 12 and generates the plurality of tested images T1, T2, T3 according to the plurality of tested objects A1, A2, A3. In the first embodiment of the present invention, the image capturing module 12 is a camera device. The camera device captures the real size of the tested objects A1, A2, A3 at different standard virtual image display distances D1, D2, D3 and records the size of the tested objects A1, A2, A3 as the tested images T1, T2, T3. Besides, the lookup table, comprising the tested images T1, T2, T3 corresponding to different standard virtual image display distances D1, D2, D3, is created according to the size of the tested objects A1, A2, A3 captured by the image capturing module 12. Furthermore, the step utilizes the lookup table by an algorithm to promote the accuracy of the following step.

In the second embodiment of the present invention, step S11 for creating the tested image database 11 comprising capturing the first tested object A1 of the first tested image T1 corresponding to the first standard virtual image display distance D1, the second tested object A2 of the second tested image T2 corresponding to the second standard virtual image display distance D2, and the third tested object A3 of the third tested image T3 corresponding to the third standard virtual image display distance D3 by the image capturing module 12. The processing module 14 generates a ratio relationship for a plurality of tested objects An(n=1, 2, 3 . . . ) corresponding to the plurality of standard virtual image display distances D according to the size of the first tested object A1 corresponding to the first standard virtual image display distance D1, the size of the second tested object A2 corresponding to the second standard virtual image display distance D2, and the size of the third tested object A3 corresponding to the third standard virtual image display distance D3. The tested image database 11 is created according to the ratio relationship.

In details, in the first embodiment, the step for creating the tested image database 11 records and captures the real size of the tested objects A1, A2, A3 of the tested image T1, T2, T3 by the image capturing module 12 according to different standard virtual image display distances D1, D2, D3. In the second embodiment, the processing module 14 generates the ratio relationship according to the size of the tested objects A1, A2, A3 captured by the image capturing module 12 and the standard virtual image display distance Dn (n=1, 2, 3 . . . ) to derive the size of other tested objects An (n=4, 5, 6 . . . ) corresponding to the standard virtual image display distance and to create the tested image database 11. In other words, the size of the object in the image with the distance has an inverse ratio. That is, the more the distance is, the smaller the size of the object is, and vice versa. Consequently, each tested object A1, A2, A3 corresponding to each standard virtual image display distance D1, D2, D3 can be generated by the ratio relationship. Then, the tested image database 11 is created. Moreover, the ratio relationship generated in the second embodiment can be verified in the first embodiment. That is, the ratio relationship between the size of the tested object An (n=1, 2, 3 . . . ) and the standard virtual image display distance Dn (n=1, 2, 3 . . . ) can be verified by contrasting with the size of the tested object An (n=1, 2, 3 . . . ) corresponding to the standard virtual image display distance Dn captured by the image capturing module 12.

After step S11 for creating the tested image database 11, step S12 selects the virtual image display distance L to be verified, selects the standard virtual image display distance D corresponding to the virtual image display distance L, selects the tested image T in the tested image database 11 corresponding to the standard virtual image display distance D, and projects the tested image T on the display element M. In the embodiment, the display element M comprises a display monitor or a projection screen.

Refer to FIG. 1B again. In step S13 for projecting the first image I1 on the stacked image element S by the user interface module H1, the image capturing module 12 simultaneously captures the first image I1 and the first tested image T1 displayed in the display element M. The first virtual image display distance L1 is the same with the first standard virtual image display distance D1. Besides, in step 13, the virtual image display distance L desired to be verified is selected by a user, but not limited to verifying single virtual image display distance. In fact, the method of the present invention verifies a plurality of virtual image display distances L according to the user demand to promote the accuracy of the virtual image display distance projected by the user interface H.

Refer to FIG. 2A and FIG. 2B again. In step S15 for performing the first reliability evaluation procedure, step S15 recognizes a plurality of feature vertexes P1, P2, P3, P4 of the first object O1 in the first image I1 by the identifying module 13 to determine whether the first object O1 in the first image I1 is approximate to a rectangle. In the method of the present invention, the processing module 14 calculates a conformance for the size of the first object O1 in the first image I1 with the size of the first tested object A1 in the first tested image T1 corresponding to the first virtual image display distance D1 to verify the accuracy of the size of the first image I1 projected by the user interface H according to the first virtual image display distance L1. Therefore, step 15 confirms the first reliability of the first image I1. The first reliability is determined by recognizing whether the first object O1 in the first image I1 is approximate to a rectangle by the identifying module 13. After that, when the first reliability is high, the method performs the following steps. Moreover, since the first tested object A1 is a rectangle, the processing module 14 calculates the difference between the four feature vertexes P1, P2, P3, P4 of the first object O1 in the first image I1 and the four vertex positions Q1, Q2, Q3, Q4 of the first tested object A1 in the first tested image T1 to generate a plurality of first distances for determining whether the first object O1 is approximate to a rectangle in step 15. The plurality of first distances are generated by calculating the difference between each feature vertex P1, P2, P3, P4 and each vertex Q1, Q2, Q3, Q4. The plurality of first distances, P1 to Q1, P2 to Q2, P3 to Q3 and P4 to Q4, are generated by the formula for calculating the distance between two points in space coordinate mathematically. If the plurality of first distances are less, the first object O1 in the first image I1 is more approximate to a rectangle and the reliability of the first image I1 is higher. If the plurality of the first distances are more, the first object O1 in the first image I1 fails to be more approximate to a rectangle and the reliability of the first image I1 is lower.

Refer to FIG. 2B again. Step S15 further comprises a step S151 for capturing a new image I. When the first image I1 fails to be approximate to a rectangle, the first reliability of the first image I1 is unreliable and step S151 performs a second reliability evaluation procedure. The user interface module H1 projects the second image T2 on the display element M. The image capturing module 12 captures the four feature vertexes P5, P6, P7, P8 of the second object O2 in the second image 12 and the four vertexes Q1, Q2, Q3, Q4 of the first tested object A1 in the first tested image T1. The identifying module 13 recognizes the four feature vertexes P5, P6, P7, P8 of the second object O2 in the second image 12 and the four vertexes Q1, Q2, Q3, Q4 of the first tested object A1 in the first tested image T1. The processing module 14 generates a plurality of second distances by calculating the difference between each feature vertex P5, P6, P7, P8 and each vertex position Q1, Q2, Q3, Q4 to determine whether the second object O2 is approximate to a rectangle. When the feature vertexes P1, P2, P3, P4 of the first object O1 have a large distortion, the first object O1 in the first image I1 recognized by the identifying module 13 fails to be approximate to a rectangle. Therefore, the image capturing module 12 needs to capture the new feature vertexes. In addition, the feature vertexes P1, P2, P3, P4 of the first object O1 in the first image I1 are automatically captured by the image recognition algorithm to adjust the accuracy of the reliability evaluation. Moreover, the accuracy of the reliability evaluation can be promoted by adjusting the system parameters or the hardware position to improve the accuracy of the reliability evaluation, such as adjusting the light illumination in the environment or altering the position of the image capturing module 12, and so on. In addition, step S15 for performing the reliability evaluation comprises an image performance measure for the image I to improve the accuracy of the virtual image display distance L. The image performance measure for the image I comprises calculating a curvature of field, calculating a resolution, and calculating a color. Besides, recognizing and capturing the feature vertexes P1, P2, P3, P4 of the first object O1 in the first image I1 are determined by contrasting the first image I1 with the pixel gray value in the ground. The prior art in the image processing field should realize the theorem; therefore, the details are omitted herein.

Refer to FIG. 3A to FIG. 3C. In step S16, the processing module 14 calculates the overlap ratio for the first image I1 and the first tested image T1. The overlap ratio is determined by calculating the area overlapping ratio between the first object O1 of the first image I1 and the first tested object A1 of the first tested image T1. When the overlap ratio is lower, the error between the first virtual image display distance L1 of the user interface H and the first standard virtual image display distance D1 (target value) is greater; in contrast, the first virtual image display distance L1 is more accurate. As shown in FIG. 3A, when a little part of the first image I1 overlaps with the first tested image T1, the overlap ratio is lower. As shown in FIG. 3B, when a large part of the first image I1 overlaps with the first tested image T1, the overlap ratio is high. As shown in FIG. 3C, when the first image I1 almost overlaps with the first tested image T1, the overlap ratio is excellent. The formula of the overlap ratio is represented below:

The overlap ratio=the area overlapping ratio between the object in the image and the tested object in the tested image/the area of the tested object In step S16, the processing module 14 generates a verification result for verifying the accuracy of the virtual image display distance L of the user interface H according to the overlap ratio. For instance, if the area overlap ratio between the object in the image I and the object in the tested image T is 100%, the image I corresponding to the virtual image display distance L (such as 10 meters) projected by the user interface (the system which is under test) H has a 100% reliability. If the area overlap ratio between the object in the image I and the object in the tested image T is 50%, the image I corresponding to the virtual image display distance L projected by the user interface H has a 50% reliability.

As mentioned above, regardless of the reliability evaluation in step S15 or the overlap ratio in step S16, the amount of the error is determined by the user demand for the accuracy of the user interface H. That is, if the user needs a high accuracy of the virtual image display distance L of the user interface H, the amount of the error for the reliability and the overlap ratio must be little. If the user would not need a high accuracy of the virtual image display distance L of the user interface H, the amount of the error for the reliability and the overlap ratio can be ignored. The present invention does not limit the amount of the error for the reliability and the overlap ratio.

Furthermore, in the embodiment of the present invention, the image I and the tested image T are not limited to be verified at the local terminal (verified by the processing module of the verification system of the dynamic virtual image display distance for the user interface). In another embodiment, the image I and the tested image T captured by the capturing module 12 can be transmitted to a cloud server to be calculated.

In summary, the verification method of the dynamic virtual image display distance of a user interface and the system thereof of the present invention creates the tested image database according to the predetermined virtual image display distance. In addition, the verification method and the system thereof can vary the information of the virtual image display distance according to the object on the road to correspond to the different object at the different distance. Moreover, the verification method and the system thereof perform the reliability evaluation and calculating the overlap ratio for the image and the tested image, overlap different image information, directly display the images on the user interface, rapidly recognize the images, and promote the accurate and the stability of the system which is under test. Besides, without extra hardware and without changing lenses, the verification method and the system thereof verify the virtual image display distance by contrasting the image with the tested image. Consequently, the verification method and the system thereof can reduce the test cost, dynamically and continuously measure the virtual image display distance, promote the verification effect, and achieve the automatic verification effect.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A verification method of a dynamic virtual image display distance of a user interface, comprising steps as follows:
    creating a tested image database; wherein the tested image database comprises at least one tested image displayed in at least one standard virtual image display distance;

displaying a first tested image in the tested image database by a display element; wherein the first tested image is one of the at least one tested image;
projecting a first image on a stacked image element by a user interface module; wherein the first image is displayed at a first virtual image display distance, and the first virtual image display distance is the same with a first standard virtual image display distance of the first tested image;
capturing the first tested image and the first image by an image capturing module;
performing a first reliability evaluation procedure for determining a similarity between a first size of a first object of the first image and a second size of a first tested object of the first tested image by an identifying module; and
calculating a first overlap ratio between the first object of the first image and the first tested object of the first tested image by a processing module to verify an accuracy of the first virtual image display distance of the user interface.

2. The verification method of the dynamic virtual image display distance of the user interface as claimed in claim 1, wherein the step for creating the tested image database comprises:
capturing a second tested image displayed at a second standard virtual image display distance by the image capturing module; and
generating the plurality of tested images according to the first tested image and the second tested image.

3. The verification method of the dynamic virtual image display distance of the user interface as claimed in claim 2, wherein the step for performing the first reliability evaluation procedure comprises:
storing a lookup table by a storage module; wherein the lookup table is created according to the first size of the first tested object of the first tested image and a second size of a second tested object of the second tested image captured by the image capturing module.

4. The verification method of the dynamic virtual image display distance of the user interface as claimed in claim 2, wherein the step for creating the tested image database comprises:
capturing the first tested object of the first tested image corresponding to the first standard virtual image display distance by the image capturing module;
capturing a second tested object of the second tested image corresponding to the second standard virtual image display distance by the image capturing module; and
generating a plurality of tested objects respectively corresponding to a plurality of standard virtual image display distances according to a ratio of the first tested object corresponding to the first standard virtual image display distance and the second tested object corresponding to the second standard virtual image display distance.

5. The verification method of the dynamic virtual image display distance of the user interface as claimed in claim 1, further comprising a step of:
calibrating an optical axis of the user interface to project the first image on the stacked image element by the user interface module according to the first virtual image display distance.

6. The verification method of the dynamic virtual image display distance of the user interface as claimed in claim 1, wherein the step for performing the first reliability evaluation procedure comprises:
recognizing a plurality of first distances between a plurality of feature vertexes of the first object of the first image and a plurality of vertex positions of the first tested object of the first tested image by the identifying module; and
determining a first reliability of the first image by the processing module according to the plurality of the first distances by the identifying module.

7. The verification method of the dynamic virtual image display distance of the user interface as claimed in claim 6, wherein the step for the first reliability evaluation procedure further comprises sub steps of:
when the first reliability of the first image is unreliable, projecting a second image on the stacked image element by the user interface module;
capturing the second image and a second tested image by the image capturing module;
recognizing a plurality of second distances between a plurality of feature vertexes of a second object of the second image and a plurality of vertex positions of a second tested object of the second tested image by the identifying module; and
determining a second reliability of the second image by the processing module according to the plurality of second distances; wherein the second image corresponds to the first virtual image display distance.

8. The verification method of the dynamic virtual image display distance of the user interface as claimed in claim 6, wherein the step for performing the first reliability evaluation procedure comprises sub steps of:
calculating a plurality of first axial gradients and a plurality of second axial gradients by the processing module for the adjacent feature vertex of the first object of the first image;
calculating the first reliability evaluation procedure according to the plurality of first axial gradients and the plurality of second axial gradients; wherein when the plurality of the first axial gradients, the plurality of the second axial gradients, and the plurality of first distances of the plurality of vertex positions are lower, the first reliability determined by the processing module according to the first image is higher.

9. The verification method of the dynamic virtual image display distance of the user interface as claimed in claim 1, wherein the step for calculating the first overlap ratio further comprises a sub step of:
calculating an area overlapping ratio between the first image and the first tested image by the processing module.

10. The verification method of the dynamic virtual image display distance of the user interface as claimed in claim 9, wherein the area overlapping ratio is generated by calculating an area overlapping portion between the first object of the first image and the first tested object of the first tested image divided by an area of the first tested object of the first tested image.

11. A verification system of a dynamic virtual image display distance for a user interface, comprising:
a tested image database, comprising at least one tested image displayed in at least one standard virtual image display distance;
an image capturing module, capturing a first tested image in the tested image database and a first image projected by a user interface module; wherein the first image corresponds to a first virtual image display distance and the first virtual image display distance is the same with a first standard virtual image display distance of the first tested image; wherein the first tested image is one of the at least one tested image;

an identifying module, performing a first reliability evaluation procedure for determining a similarity between a first size of a first object of the first image and a second size of a first tested object of the first tested image; and a processing module, calculating a first overlap ratio for the first object of the first image and the first tested object of the first tested image to verify an accuracy of the first virtual image display distance of a user interface.

12. The verification system of the dynamic virtual image display distance for the user interface as claimed in claim 11, wherein the tested image database is created by capturing a second tested image corresponding to a second standard virtual image display distance and generating the plurality of tested images by the image capturing module according to the first tested image and the second tested image.

13. The verification system of the dynamic virtual image display distance for the user interface as claimed in claim 12, further comprising a storage module, storing a lookup table; wherein the lookup table is created according to the first tested object of the first tested image and a second tested object of the second tested image captured by the image capturing module.

14. The verification system of the dynamic virtual image display distance for the user interface as claimed in claim 12, wherein the tested image database is created by capturing the first tested object of the first tested image corresponding to the first standard virtual image display distance and capturing a second tested object of the second tested image corresponding to the second standard virtual image display distance by the image capturing module, and generating a plurality of tested objects respectively corresponding to a plurality of standard virtual image display distances by the processing module according to a ratio of the first tested object corresponding to the first standard virtual image display distance and the second tested object corresponding to the second standard virtual image display distance.

15. The verification system of the dynamic virtual image display distance for the user interface as claimed in claim 11, wherein the user interface module is disposed in a user interface, the user interface comprises an optical axis, and the user interface module accurately projects the first image on the stacked image element according to the first virtual image display distance after calibrating the optical axis.

16. The verification system of the dynamic virtual image display distance for the user interface as claimed in claim 11, wherein the identifying module recognizes a plurality of first distances between a plurality of feature vertexes of the first object of the image and a plurality of vertex positions of the first tested object of the tested image and determines the first reliability of the first image by the processing module according to the plurality of the first distances.

17. The verification system of the dynamic virtual image display distance for the user interface as claimed in claim 16, wherein when the first reliability of the first image is unreliable, the user interface module projects a second image on the stacked image element, the image capturing module captures the second image and a second tested image, the identifying module recognizes a plurality of second distances between a plurality of feature vertexes of a second object of the second image and a plurality of vertex positions of a second tested object of the second tested image, and the processing module determines a second reliability of the second image according to the plurality of second distances; wherein the second image corresponds to the first virtual image display distance.

18. The verification system of the dynamic virtual image display distance for the user interface as claimed in claim 16, wherein the processing module further calculates a plurality of first axial gradients and a plurality of second axial gradients for the adjacent feature vertex of the first object of the first image and calculates the first reliability evaluation procedure according to the plurality of first axial gradients and the plurality of second axial gradients; wherein when the plurality of the first axial gradients and the plurality of the second axial gradients and the plurality of first distances of the plurality of vertex positions are lower, the first reliability determined by the processing module according to the first image is higher.

19. The verification system of the dynamic virtual image display distance for the user interface as claimed in claim 11, wherein the processing module calculates the overlap ratio by calculating an area overlapping ratio between the first image and the first tested image.

20. The verification system of the dynamic virtual image display distance for the user interface as claimed in claim 19, wherein the area overlapping ratio is generated by calculating an area overlapping portion between the first object of the first image and the first tested object of the first tested image divided by an area of the first tested object of the first tested image.

* * * * *